US008559390B2

(12) United States Patent
Lee et al.

(10) Patent No.: US 8,559,390 B2
(45) Date of Patent: Oct. 15, 2013

(54) METHOD AND APPARATUS FOR PERFORMING VERTICAL HANDOVER IN SDR TERMINAL

(75) Inventors: Seung-que Lee, Daejeon-si (KR); Nam-hoon Park, Daejeon-si (KR); Yeong-jin Kim, Daejeon (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 923 days.

(21) Appl. No.: 12/580,461

(22) Filed: Oct. 16, 2009

(65) Prior Publication Data
US 2010/0136973 A1 Jun. 3, 2010

(30) Foreign Application Priority Data
Dec. 1, 2008 (KR) ........................ 10-2008-0120577

(51) Int. Cl.
*H04W 4/00* (2009.01)
(52) U.S. Cl.
USPC .......................................................... 370/331
(58) Field of Classification Search
USPC .......................................................... 370/331
See application file for complete search history.

(56) References Cited

U.S. PATENT DOCUMENTS

| | | | |
|---|---|---|---|
| 6,795,444 B1* | 9/2004 | Vo et al. ........................ | 370/401 |
| 7,092,733 B2* | 8/2006 | Mukai et al. ................ | 455/552.1 |
| 7,151,925 B2 | 12/2006 | Ting et al. | |
| 7,404,074 B2* | 7/2008 | Murotake ..................... | 713/100 |
| 2002/0137514 A1* | 9/2002 | Mitsugi et al. ................ | 455/436 |
| 2004/0029575 A1* | 2/2004 | Mehta ............................. | 455/419 |
| 2004/0219918 A1* | 11/2004 | Kakishima et al. ........... | 455/436 |
| 2005/0227684 A1* | 10/2005 | Niedermeier et al. ........ | 455/420 |
| 2006/0130053 A1 | 6/2006 | Buljore et al. | |
| 2008/0101311 A1* | 5/2008 | Bernhard et al. ............. | 370/342 |
| 2008/0310371 A1* | 12/2008 | Russell .......................... | 370/331 |
| 2009/0129336 A1* | 5/2009 | Osborn ......................... | 370/331 |
| 2009/0154423 A1* | 6/2009 | Song et al. .................... | 370/331 |
| 2011/0039579 A1* | 2/2011 | Karjalainen ............... | 455/456.1 |

FOREIGN PATENT DOCUMENTS

| | | |
|---|---|---|
| EP | 1 503 603 A2 | 2/2005 |
| JP | 2007-208312 A | 8/2007 |
| KR | 10-2006-0005599 | 1/2006 |

* cited by examiner

*Primary Examiner* — Steven H Nguyen
*Assistant Examiner* — Saad A Waqas
(74) *Attorney, Agent, or Firm* — Rabin & Berdo, P.C.

(57) ABSTRACT

Disclosed are a method and apparatus for allowing a Software Defined Radio (SDR) terminal to perform a vertical handover between different services. The vertical handover method includes: receiving a handover request from an application service which is currently being executed; selecting a new application service which is a handover target from among a plurality of application services, in response to the handover request; installing the new application service in the SDR terminal so that the new application service is executable by the SDR terminal; and performing a handover to the new application service. Accordingly, since handover is performed seamlessly between different services, continuity of service may be ensured.

14 Claims, 4 Drawing Sheets

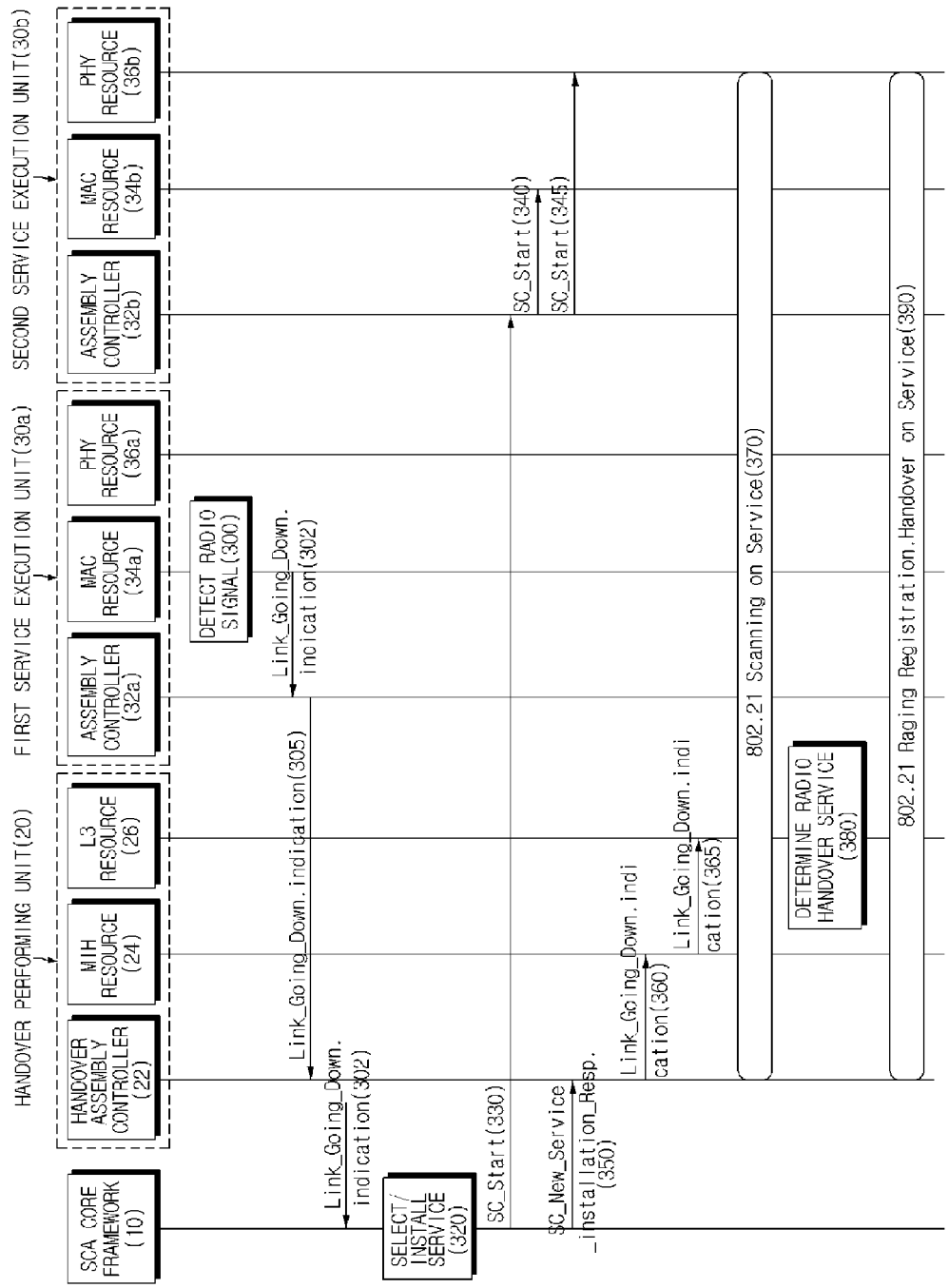

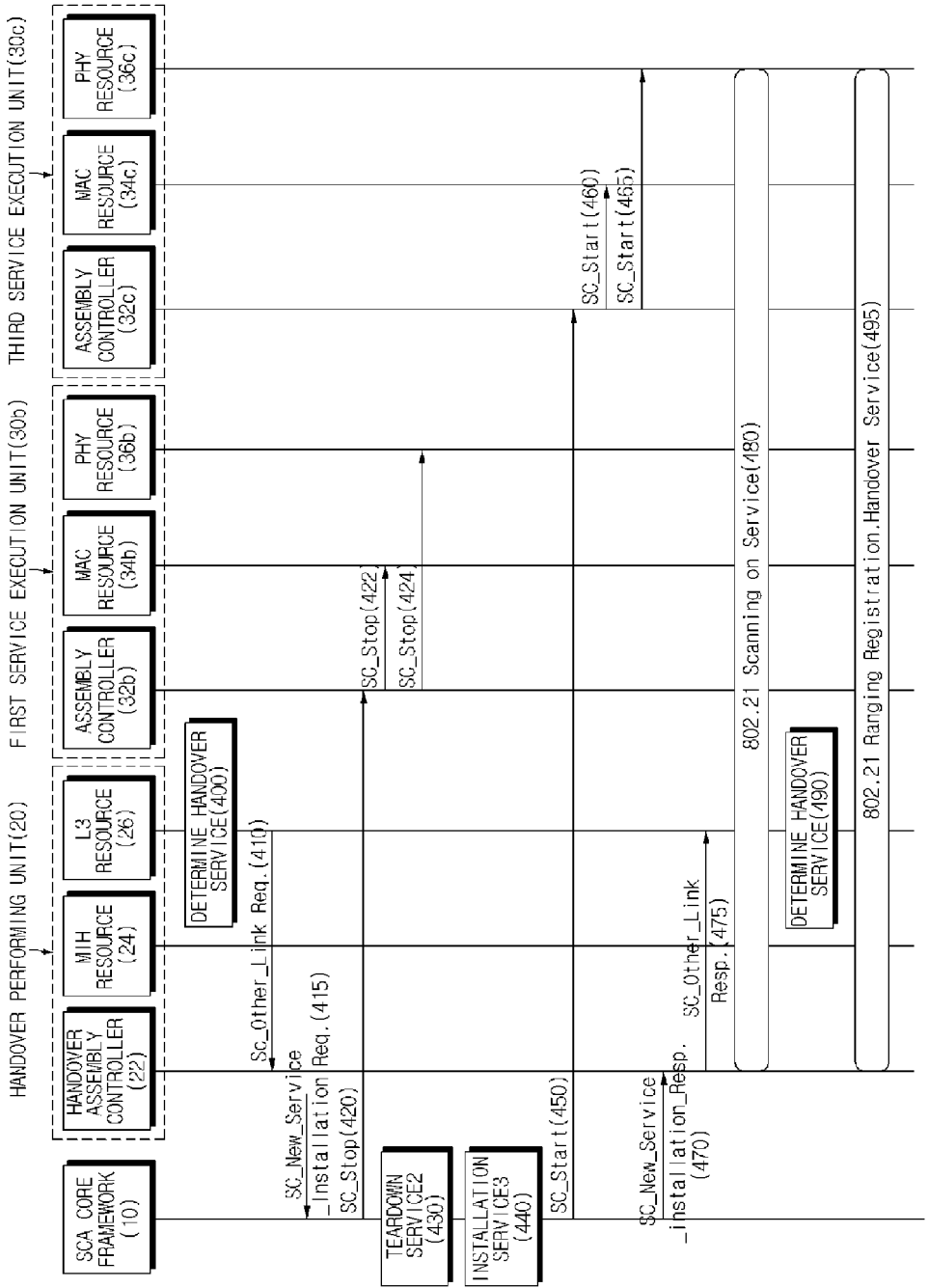

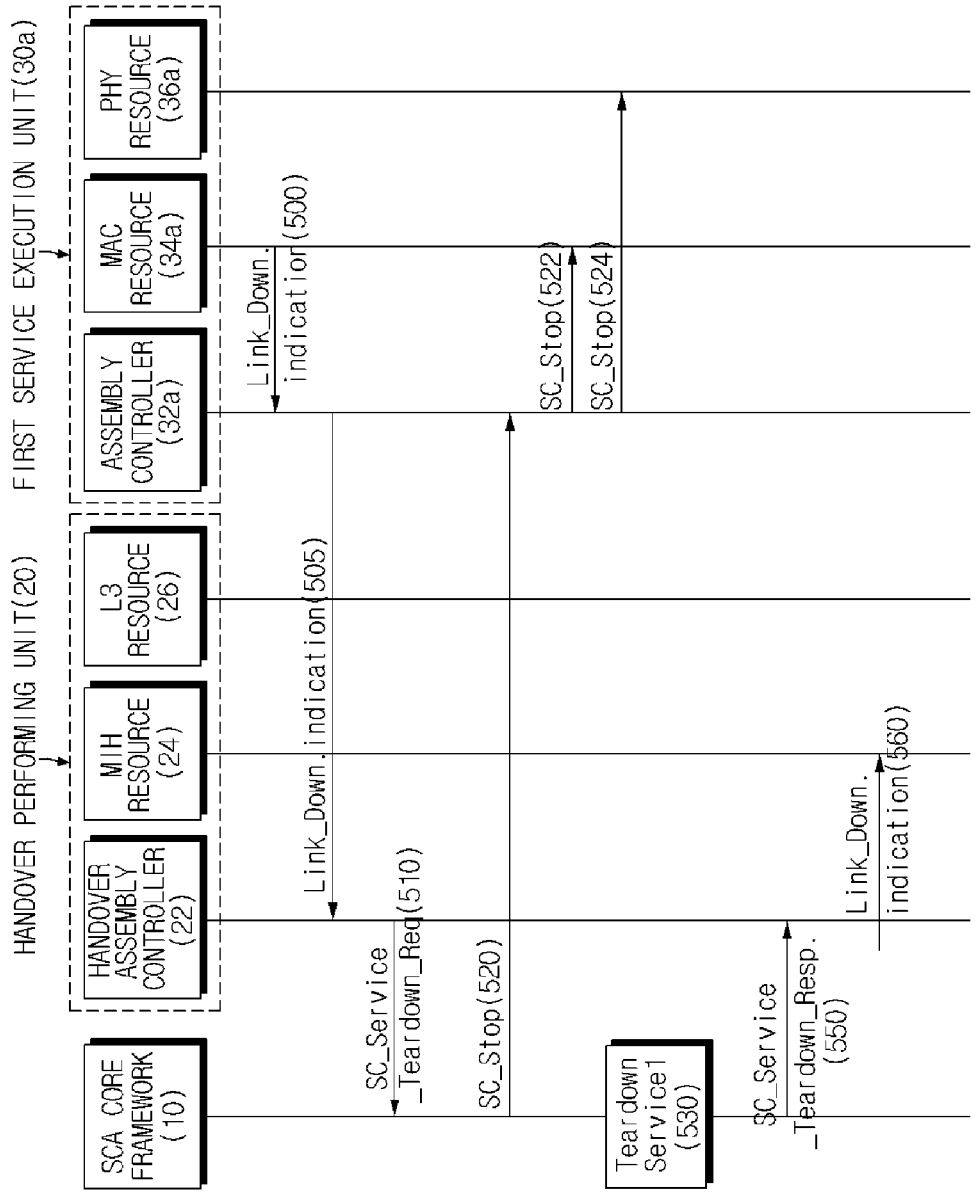

METHOD AND APPARATUS FOR PERFORMING VERTICAL HANDOVER IN SDR TERMINAL

CROSS-REFERENCE TO RELATED APPLICATION

This application claims the benefit under 35 U.S.C. §119(a) of Korean Patent Application No. 10-2008-120577, filed on Dec. 1, 2008, the disclosure of which is incorporated by reference in its entirety for all purposes.

BACKGROUND

1. Field

The following description relates to a Software Defined Radio (SDR) terminal, and more particularly, to a method and apparatus for allowing a Software Defined Radio (SDR) terminal to perform a vertical handover between different services.

2. Description of the Related Art

The structure of a Software Defined Radio (SDR) terminal is based on a Software Communication Architecture (SCA) core framework.

SCA is a standardized communication software proposed by the U.S. Joint Tactical System (JTRS) Joint Program Office (JPO) for the purpose of improving inter-operability between communication systems and reducing costs for development and design. A SDR system seeks high compatibility and inter-operability between configuration modules by adopting SCA as a software framework standard.

Vertical handover (VHO) means handover between different services. As mobile communication services diversify, there are cases where users who have subscribed with two or more mobile communication services. And, users want to get mobile communication services seamlessly while migrating between different mobile communication services as necessary.

For example, if a user who uses an IEEE 802.11 Wireless LAN (WLAN) indoors changes to the service of an IEEE 802.16e Mobile WiMAX service when he or she goes outdoors, then this means that a handover between the two services has occurred.

A recently proposed vertical handover, which is based on the IEEE 802.21 standard, locates Media Independent Handover (MIH) between a Medium Access Control (MAC) layer and a Layer 3 (L3) layer. Also, the method causes MIH to standardize and accept handover-associated primitives of various MAC layers for each media so that the L3 layer can control handover between services through a single method. The 802.21-based vertical handover enables seamless handover between a plurality of MAC/PHY protocols installed in advance under the control of a single MIH.

A SDR terminal is an open system designed to flexibly receive various communication services with a single piece of hardware. A SDR terminal has been initially provided in the is form of Bare Machine. A SDR terminal downloads protocols for a desired service as necessary, and then installs therein and executes them. The SDR terminal is expected to be a system which is flexibly adaptable to the current mobile communication environment including frequent creations and abandoning of various mobile communication services.

The 802.21-based vertical handover technique is structured under the basic assumption that protocol sets of relevant mobile communication services should be installed in a terminal. For example, when a vertical handover occurs between 802.11 and 802.16e, 802.11 MAC/PHY and 802.16e have to be installed in a corresponding terminal and be in a standby state for execution to respond to MIH commands. Accordingly, if the number of service objects that allow vertical handover is N, then N number of MAC/PHY protocols have to be installed in advance in the corresponding terminal.

However, in the 802.21-based vertical handover technique, since all protocols of all services with which a user subscribes have to be loaded into hardware, it may cause unnecessary waste of hardware resources, resulting in inefficient resource management. Also, since whenever a change occurs in use of service, such as service subscription or service secession, the corresponding set of protocols has to be newly installed or deleted, and as such an inconvenience with regards to required updates or replacements is created.

Meanwhile, in the case of the SDR terminal, there are advantages in that, when a service changes to another one, not too many protocols are required to be loaded and replacement of hardware is also not required. In order to perform a seamless vertical handover, a service that is to be handed over has to be recognized in advance. Otherwise, an additional time for installing an application service for a service that is to be handed over would be required. This is because a SDR terminal requires a time to download and install protocol sets of a required service. Consequently, since any time consumed to install new application services delay handover, continuity of service may not be ensured.

SUMMARY

The following description relates to a method and apparatus for allowing a Software Defined Radio (SDR) terminal to perform seamless vertical handover.

According to an exemplary aspect, there is provided a vertical handover method which is performed by a Software Defined Radio (SDR) terminal capable of selectively executing at least one of a plurality of application services, the method including: receiving a handover request from an application service which is being currently executed; selecting a new application service which is a handover target from among the plurality of application services, in response to the handover request; installing the new application service in the SDR terminal so that the new application service is executable by the SDR terminal; and performing a handover to the new application service.

The selecting of the new application service includes preferentially selecting an application service which has not recently been installed in the SDR terminal, based on installation history information about application services executable in the SDR terminal.

The performing of the handover includes performing the handover when an installation completion message is received from the new application service.

The vertical handover method, before the performing of the handover, further includes performing channel-scanning on the new application service, wherein the performing of the handover comprises performing the handover when it is determined according to the result of the channel-scanning that the handover is allowed.

The vertical handover method, after the performing of the channel-scanning, further includes if the channel-scanning fails, transmitting a service stop command to the new application service.

According to another exemplary aspect, there is provided an apparatus for vertical handover which is included in a Software Defined Radio (SDR) terminal capable of selectively executing at least one of a plurality of application services, including: at least one service execution unit which is software-reconfigurable and capable of executing various application services; and a handover execution unit to perform a handover between the application services that are executable by the SDR terminal; and a Software Communication Architecture (SCA) core framework, when receiving a handover request from the service execution unit which executes an application service, to generate a service execution unit for executing an application service that is a handover target, and to control execution of a handover of the SDR terminal in connection with the service execution unit and the handover execution unit.

Accordingly, due to the feature of a SDR terminal which is that it can provide various application services without having to load many protocols, there is provided flexibility in joining or leaving services.

Furthermore, by enabling a SDR terminal to perform seamless handover between different services, service continuity is ensured.

Other objects, features and advantages will be apparent from the following description, the drawings, and the claims.

BRIEF DESCRIPTION OF THE DRAWINGS

FIG. 2 is a flowchart illustrating a handover method according to an exemplary embodiment.

FIG. 3 is a flowchart illustrating a handover method after channel-scanning fails, is according to an exemplary embodiment.

FIG. 4 is a flowchart illustrating a procedure of stopping a previous service after a handover is completed in the handover method.

Elements, features, and structures are denoted by the same reference numerals throughout the drawings and the detailed description, and the size and proportions of some elements may be exaggerated in the drawings for clarity and convenience.

DETAILED DESCRIPTION

Figure 1:
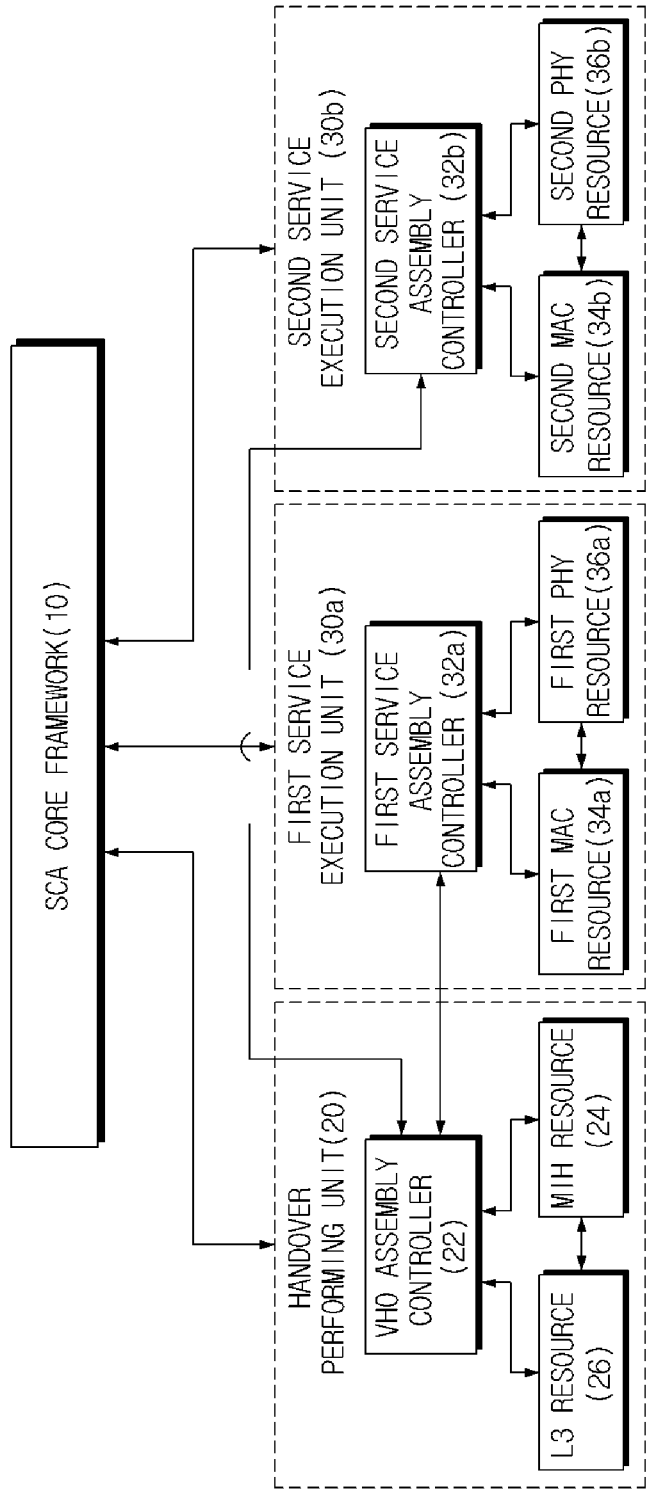
FIG. 1 is a block diagram illustrating an apparatus for vertical handover according to an exemplary embodiment.

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

FIG. 1 is a block diagram illustrating an apparatus for vertical handover according to an exemplary embodiment. Referring to FIG. 1, the vertical handover apparatus includes a Software Communication Architecture (SCA) core framework 10, a handover performing unit 20 and a service execution unit 30.

The SCA core framework 10 may be middleware that works at the hub of a Software Defined Radio (SDR) terminal. In the current embodiment, the SCA core framework 10 performs domain management, device management, file management, management of application programs, etc. That is, the SCA core framework 10 plays a key part in operating the SDR terminal to fulfill the concept of SDR. Also, the SCA core framework 10 controls the handover performing unit 20 and the service execution unit 30.

The handover performing unit 20 includes a handover assembly controller 22, a layer-3 (L3) resource 26 and a Media Independent (MIH) resource 24. The handover performing unit 20 is composed of service-independent layers. The L3 resource 26 may control all operations associated with handover of the SDR terminal. The MIH resource 24 performs handover primitive processing between 802.21 services. The handover assembly controller 22 processes SCA control commands between the L3 resource 26, MIH resource 24 and SCA core framework 10. Also, the handover assembly controller 22 relays communications between lower resources of the service execution unit 30 which will be described later.

In the current embodiment, the handover performing unit 20 is downloaded and installed in the SDR terminal when the SDR terminal is initialized. The downloading and installing of the handover performing unit 20 are done unconditionally regardless of the types of services that are to be installed or started by the service execution unit 30.

The service execution unit 30 includes a service assembly controller 32, a Medium Access Control (MAC) resource 34 and a Physical Layer (PHY) resource 36. The MAC resource 34 and PHY resource 36, which are protocols dependent on communication services, are respectively in charge of MAC and PHY. The service assembly controller 32 processes SCA control commands between the MAC resource 34, PHY resource 36 and SCA core framework 10. Also, the service assembly controller 32 relays communications with the resources of the handover performing unit 20.

The service execution unit 30 is installed as one of communication services with which a terminal's user has subscribed. Generally, while a service is being used, a corresponding service execution unit 30 is selected, installed and started, but while a handover is being processed, the service currently being used and another service which is a handover target may be simultaneously started or installed.

In the current embodiment, 'application services' are not limited to specific application services which fall under the concept of SDR. That is, in the current embodiment, the 'application services' may be selected, downloaded and installed arbitrarily by users. According to an embodiment, if a user selects an 802.11 Wireless LAN service as the first service execution unit 30a, the first service execution unit 30a executes the 802.11 WLAN service and accordingly the first assembly controller 32a, and the first MAC resource 34a and the first PHY resource 36a are installed to be suitable for the 802.11 WLAN service.

In the current embodiment, a communication channel is established between the handover assembly controller 22 and the service assembly controller 32a and 32b. The communication channel is for communications between the MAC resource 34 of the service execution unit 30 which is to perform application services and the L3 resource 26 and the MIH resource 24 which form the handover execution unit 20. Primitives associated with 802.21 vertical handover are transmitted and received between the MAC resource 34 and MIH resource 24, and signal information or traffic data, etc. are transmitted and received between the MAC resource 34 and L3 resource 26. As described above, message transmission/reception between the L3 resource 26, the MIH resource 24, the MAC resource 34 and the PHY resource 36 may be performed under the control of the handover assembly controller 22, the first service assembly controller 32a and the second service assembly controller 32b.

Hereinafter, a method of supporting handover will be described with reference to FIGS. 2, 3 and 4.

FIG. 2 is a flowchart illustrating a handover method according to an exemplary embodiment. First, it is assumed that a terminal is performing a first application service. While the terminal is performing the first application service, a MAC resource 34a of a first service execution unit 30a may detect if a service radio signal is weak (operation 300). If the MAC resource 34a determines that a service radio signal is weak, the MAC resource 34a transmits a message indicating that the service radio signal is weak to a first service assembly controller 32a, thus transmitting a handover request (operation 302). At this time, the MAC is resource 34a may transmit as a handover request message 802.21 primitive Link_Going_Down.indication to the first service assembly controller 32a. Then, the first service assembly controller 32a transmits the received handover request as a Link_Going_Down.indication message having the same primitive format to the handover assembly controller 22 of the handover performing unit 20 (operation 305).

Then, the handover assembly controller 22 requests installation of a new service to a SCA core framework 10 (operation 310). At this time, the handover assembly controller 22 may request installation of a new service to the SCA core framework 10 by transmitting a SC_New_Service_Installation_Request message to the SCA core framework 10.

Then, the SCA core framework 10 selects and installs one of services with which the terminal has subscribed, based on a Software Component Description (SCA) and a Software Assembly Descriptor (SAD) of a domain profile, in response to the service installation request (operation 320). The SCA core framework 10 may preferentially select an application service which has been not recently been installed in the terminal, based on installation history information about application services that have been previously installed in the terminal. That is, the SCA core framework 10 may exclude services which are currently being served or which have recently failed in a channel-scan.

Then, the SCA core framework 10 installs an assembly controller 32a, a MAC resource 34a and a PHY resource 36a to execute the application service for the new service, and if the installation is completed, transmits a SC_Start message to the second service assembly controller 32b to instruct execution of the application service (operation 330). Then, the second service assembly controller 32b transmits a SC_Start message which is an operation start command to the MAC resource 34b and the PHY resource 36b, thus starting the operation of the MAC resource 34b and the PHY resource 36b (operations 340 and 345).

When the installation and execution of the new service, that is, the second service is execution unit 30b are completed, the SCA core framework 10 transmits a SC_New_Service Installation Response message to the handover assembly controller 22 of the handover performing unit 20, thereby informing the handover assembly controller 22 that installation of the new service has been completed (operation 350).

Then, the handover assembly controller 22 relays a Link-Going_Down.indication message to the MIH resource 24 (operation 360) and again transfers the Link-Going_Down.indication message to the L3 resource 26 (operation 365). In this way, before a report message indicating radio signal weakness of the MAC layer of the first service execution unit 30a which has been previously activated is transmitted to the MIH and L3 layers, the SCA core framework 10 can start installation of another service which is a handover target.

Thereafter, the MIH resource 24 and L3 resource 26 of the handover performing unit 20 perform a channel-scanning procedure on the service that is to be executed in an 802.21 channel, that is, in the second service execution unit 30b (operation 370). The channel-scanning procedure is based on the 802.21 standard. When performing the channel-scanning procedure, communications between the MIH resource 24 and L3 resource 26 which are the lower resources of the handover assembly controller 22, and the MAC resource 34a and the PHY resource 36a which are the lower resources of the assembly controller 32a are performed through the relay of the handover assembly controller 22 and assembly controller 32a.

After the channel-scanning, the L3 resource 26 of the handover performing unit 20 checks if the channel-scanning is successful. If the channel-scanning is successful, it is determined that the corresponding service is a radio channel allowing a handover (operation 380) and accordingly, 802.21 ranging, registration and handover procedures are sequentially performed, so that a handover on the service is completed (operation 390).

FIG. 3 is a flowchart illustrating a handover method after channel-scanning fails, is according to an exemplary embodiment.

After the channel-scanning, if the L3 resource 26 of the handover performing unit 20 determines that the channel-scanning fails (operation 400), this means that a handover to the corresponding radio channel is disallowed and accordingly a new service has to be selected. Thus, a SC_Other_Link_Request message indicating that a new service has to be selected is generated and transmitted to the handover assembly controller 22 (operation 410).

Then, the handover assembly controller 22 transmits a SC_New_Service_Installation_Request message for requesting installation of another new service to the SCA core framework 10 (operation 415).

Then, the SCA core framework 10 transmits a SC_Stop message for stopping service execution, to the assembly controller 32b of the second service execution unit 30b which has failed in channel-scanning (operation 420). The assembly controller 32b of the second service execution unit 30b transmits the SC_Stop message for stopping service execution to the MAC resource 34b and the PHY resource 36b which are the lower resources of the assembly controller 32b (operations 422 and 424). Accordingly, the execution of the second service is stopped, and the SCA core framework 10 tears down the corresponding service (operation 430).

Then, the SCA core framework 10 selects one of services with which the SDA terminal has subscribed, based on a SCD and a SAD of domain profiles of the SCA core framework 10, and installs the selected service (operation 440). At this time, the SCA core framework 10 preferentially selects an application service which has not been recently installed in the terminal, based on installation history information about application services that have been previously installed in the terminal, in order to prevent the first service that is being currently being served or the second service that has recently failed in channel-scanning from being selected. This is to prevent any unnecessary processes from occurring.

In the current embodiment, the SCA core framework 10 selects a third service and is generates a third service execution unit 30c associated with the third service. In detail, an assembly controller 32c, a MAC resource 34c and a PHY resource 36c for executing the third service are generated and installed. If installation of the third service execution unit 30c is completed (operation 440), the SCA core framework 10 transmits a SC_Start message to the assembly controller 32c of the third service execution unit 30c and causes the assembly controller 32c to operate (operation 450). Also, the assembly controller 32c transfers the SC_Start message to the MAC resource 34c and the PHY resource 36c to operate them (operations 460 and 465).

If the installation and execution of the new service, that is, the third service are completed, the SCA core framework 10 transmits a SC_New_Service_Installation_Response message to the handover assembly controller 22 of the handover execution unit 20, thus informing the handover assembly controller 22 that installation of the new service has been completed (operation 470). Then, the handover assembly controller 22 transmits a SC_Other_Link_Response message to the L3 resource 26, thus informing the L3 resource 26 that installation of the new service has been completed (operation 475).

In summary, when the channel scanning of the previously installed/started second service fails, the second service is torn down and stopped, and another service, that is, the third service is selected, installed and started.

Thereafter, channel-scanning is performed on the third service (operation 480), it is determined whether the channel scanning is successful (operation 490), and a handover is performed according to the result of the determination (operation 495).

If the channel-scanning again fails, the process returns to operation 5400 of selecting a new service and the procedure described above is repeated. The procedure is repeated until a service is found on which channel scanning is successful or until a service with which a user subscribes does no longer exist in the SCD and SAD of the SCA core framework 10.

FIG. 4 is a flowchart illustrating a procedure of stopping a previous service after a handover is completed in the handover method.

If a handover to a second or third service has been completed, radio signals associated with the first service are disconnected. Accordingly, the MAC resource 34a of the first service execution unit 30a may detect the disconnection of radio signals, and transfers any result of detection to the handover assembly controller 22 of the handover execution unit 20 via the assembly controller 32a (operation 500). At this time, the result of the detection may be transmitted in the form of a Link_Down.indication message to the handover assembly controller 22.

Then, the handover assembly controller 22 transmits a SC_Service_Teardown_Request message as a request for tearing down the first service to the SCA core framework 10 (operation 510). Then, the SCA core framework 10 transmits a SC_Stop message to the assembly controller 32a of the first service execution unit 30a, thus requesting the assembly controller 32a to stop execution of the first service (operation 520). The assembly controller 32a transfers the SC_Stop message to the MAC resource 34a and the PHY resource 36a, thus stopping the operation of the MAC resource 34a and the PHY resource 36a (operation 522 and 524).

When the execution of the MAC and the PHY resources 34a and 36a of the first service execution unit 30a is stopped, the SCA core framework 10 performs a teardown procedure on the first service (operation 530). Then, the SCA core framework 10 transmits a SC_Service_Teardown_Response message to the handover assembly controller 22 to inform that the teardown of the first service has been completed (operation 550). Then, the handover assembly controller 22 relays the Link_Down.indication message received from the assembly controller 32a of the first service execution unit 30a to the MIH resource 24 (operation 560).

Accordingly, before a signal disconnection report from the MAC resource 34a of the first service execution unit 30a is transferred to the MIH resource 24 of the handover performing unit 20, the first service execution unit 20 is torn down.

Meanwhile, the method for performing vertical handover in SDR terminal described above can be implemented as a computer program. The computer program can be stored in computer-readable recording media and read and executed by a computer. The computer-readable recording media may be implemented on a magnetic tape, an optical data storage, or the like.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A vertical handover method which is performed by a Software Defined Radio (SDR) terminal capable of selectively executing at least one of a plurality of application services, the method comprising:
   receiving a handover request from an application service which is being currently executed;
   selecting a new application service which is a handover target from among the plurality of application services, in response to the handover request, based at least partly on installation history information about application services executable in the SDR terminal;
   installing the new application service in the SDR terminal so that the new application service is executable by the SDR terminal; and
   performing a handover to the new application service;
   wherein the selecting of the new application service comprises preferentially selecting an application service based on a time of previous installation of the application service in the SDR terminal and on a record of the application service with respect to a channel scanning; and
   wherein the selecting of the new application service comprises selecting the new application service based on a Software Component Descriptor (SCD) and a Software Assembly Descriptor (SAD) of a domain profile of the SDR terminal.

2. The vertical handover method of claim 1, wherein the performing of the handover comprises performing the handover when an installation completion message is received from the new application service.

3. The vertical handover method of claim 1, before the performing of the handover, further comprising performing channel-scanning on the new application service,
   wherein the performing of the handover comprises performing the handover when it is determined according to the result of the channel-scanning that the handover is allowed.

4. The vertical handover method of claim 3, after the performing of the channel-scanning, further comprising:
   if the channel-scanning fails, transmitting a service stop command to the new application service; and
   stopping installation of the new application service according to the service stop command.

5. The vertical handover method of claim 4, further comprising if the channel-scanning fails, selecting another new application service other than the new application service on which the channel-scanning has failed.

6. The vertical handover method of claim 1, wherein the installing of the new application service comprises:
   generating and installing a controller and resources required to execute the new application service; and
   if it is determined that the installation of the new application service has been completed, executing the new application service.

7. The vertical handover method of claim 1, after the performing of the handover, further comprising:
transmitting a service stop request to the application service which is currently being executed; and
stopping installation of the application service according to the service stop request.

8. An apparatus for vertical handover which is included in a Software Defined Radio (SDR) terminal capable of selectively executing at least one of a plurality of application services, comprising:
at least one service execution unit which is software-reconfigurable and capable of executing various application services;
a handover execution unit to perform a handover between the application services that are executable by the SDR terminal; and
a Software Communication Architecture (SCA) core framework, in response to receiving a handover request from the service execution unit which executes an application service, to generate a service execution unit for executing an application service that is a handover target, and to control execution of a handover of the SDR terminal in connection with the service execution unit and the handover execution unit based at least partly on installation history information about application services executable in the SDR terminal;
wherein the SCA core framework is further to preferentially select an application service based on a time of previous installation of the application service in the SDR terminal and on a record of the application service with respect to a channel scanning; and
wherein the SCA core framework is further to select the new application service based on a Software Component Descriptor (SCD) and a Software Assembly Descriptor (SAD) of a domain profile.

9. The apparatus of claim 8, wherein the SCA core framework controls an entire operation of the SDR terminal.

10. The apparatus of claim 8, wherein the handover execution unit comprises:
a Layer3 (L3) resource to control a handover operation;
a Media Independent Handler (MIH) resource to perform handover primitive processing between the application services that are executable by the service execution unit; and
a handover assembly controller to process control commands between the L2 resource, the MIH resource, and the SCA core framework.

11. The apparatus of claim 10, wherein the handover assembly controller, when receiving a handover request from the service execution unit which executes the application service, requests the SCA core framework to generate the service execution unit for executing the application service which is the handover target and requests the MIH resource to perform channel-scanning on the application service after the generation of the service execution unit.

12. The apparatus of claim 10, wherein the L3 resource determines the result of the channel-scanning on the application service, and
if the L3 resource determines that the channel-scanning on the application service fails, the handover assembly controller requests the SCA core framework to generate a service execution unit for executing another application service.

13. The apparatus of claim 10, wherein the handover assembly controller, when receiving a signal indicating radio signal disconnection from the service execution unit which executes the application service, transmits a service stop request for stopping execution of the application service to the SCA core framework and transmits the service stop request to the MIH resource when receiving a response to the service stop request.

14. The apparatus of claim 8, wherein the service execution unit comprises:
a Medium Access Control (MAC) resource which controls a MAC layer;
a Physical Layer (PHY) resource which controls a physical layer; and
a service assembly controller to process control commands between the MAC resource, the PHY resource and the SCA core framework.

* * * * *